(12) United States Patent
Nelson et al.

(10) Patent No.: US 8,370,995 B2
(45) Date of Patent: Feb. 12, 2013

(54) DETACHABLE BEVERAGE CONTAINER HANDLE

(76) Inventors: Scott D. Nelson, New York, NY (US); Douglas Kesten, New York, NY (US)

( * ) Notice: Subject to any disclaimer, the term of this patent is extended or adjusted under 35 U.S.C. 154(b) by 491 days.

(21) Appl. No.: 12/612,744

(22) Filed: Nov. 5, 2009

(65) Prior Publication Data

US 2010/0051635 A1 Mar. 4, 2010

Related U.S. Application Data

(63) Continuation-in-part of application No. 11/454,138, filed on Jun. 16, 2006, now abandoned.

(51) Int. Cl.
*A47J 45/07* (2006.01)
(52) U.S. Cl. ............................. 16/425; 16/426
(58) Field of Classification Search .................... 16/425, 16/110.1, 413; 220/317, 318, 752–759, 741, 220/768–769; 215/396; 294/27.1, 31.1
See application file for complete search history.

(56) References Cited

U.S. PATENT DOCUMENTS

| | | | |
|---|---|---|---|
| 2,580,824 A | 1/1952 | Oliver | |
| 2,639,502 A | 5/1953 | Wormelle, Jr. | |
| 2,868,434 A | 1/1959 | Jones | |
| D195,985 S | 8/1963 | Scherrer et al. | |
| 3,189,937 A | 6/1965 | Sciortino | |
| 3,979,011 A | 9/1976 | Schleicher | |
| D251,175 S | 2/1979 | Logan et al. | |
| D254,417 S | 3/1980 | DeMars et al. | |
| 4,654,274 A | 3/1987 | DeMars | |
| 4,791,030 A | 12/1988 | DeMars | |
| 4,898,297 A | 2/1990 | Wheeler | |
| 4,993,675 A | 2/1991 | Walker | |
| 5,203,471 A | 4/1993 | Widman | |
| D360,108 S * | 7/1995 | Blankenburg et al. | D7/515 |
| D362,371 S | 9/1995 | Williams et al. | |
| 5,597,190 A * | 1/1997 | DeMars | 294/33 |
| 5,884,955 A | 3/1999 | Pucillo | |
| 6,102,458 A * | 8/2000 | Scace | 294/34 |
| 6,237,194 B1 | 5/2001 | Williams | |
| 6,363,568 B1 | 4/2002 | Harrison et al. | |
| 6,961,978 B2 | 11/2005 | Earley et al. | |
| 7,013,618 B2 | 3/2006 | Schiltz et al. | |
| 7,080,753 B1 | 7/2006 | Miller | |
| 7,604,270 B1 * | 10/2009 | McCarthy | 294/29 |

* cited by examiner

*Primary Examiner* — Victor Batson
*Assistant Examiner* — Matthew Sullivan
(74) *Attorney, Agent, or Firm* — Schiff Hardin LLP

(57) ABSTRACT

A detachable beverage container handle includes a reusable figurine-shaped handle which can be mounted and released from beverage contains of a plurality of container diameters. The figurine is hinged to accommodate containers of different sizes. A lower extremity of the figurine includes a clamp for engaging the base or bottom of the container. an upper extremity of the figurine has a clamp for engaging the rim of the container. An embodiment of the handle has a rim clamp with pivoting arms that force gripping surfaces of the clamp into an engaging position on the rim. A user may pivot the arms to a release position.

22 Claims, 3 Drawing Sheets

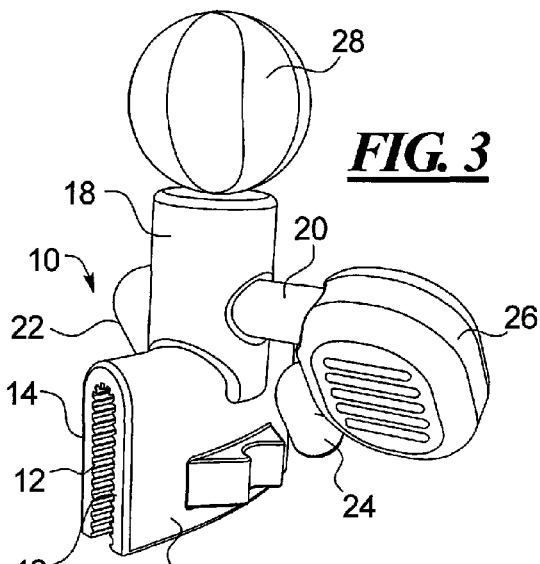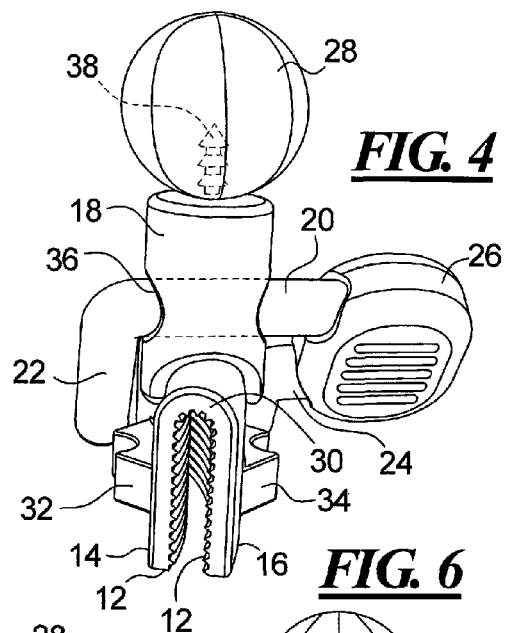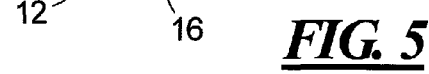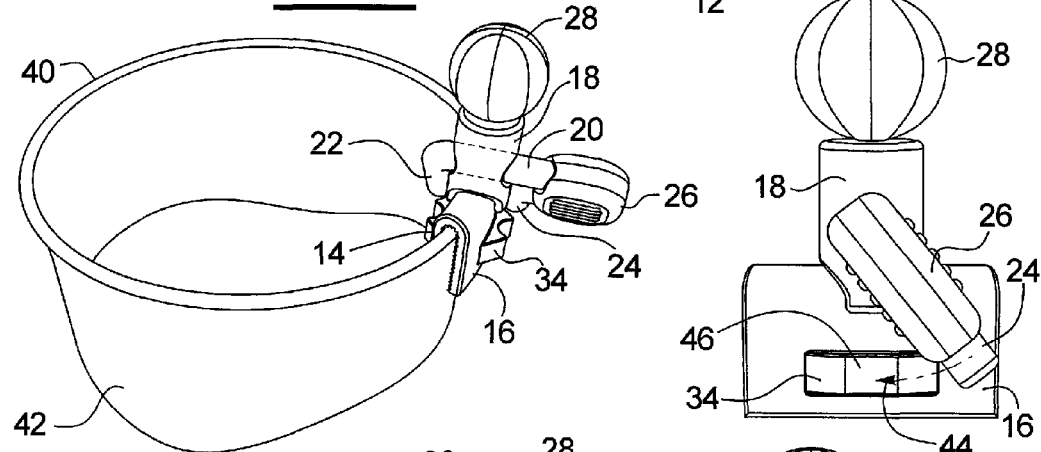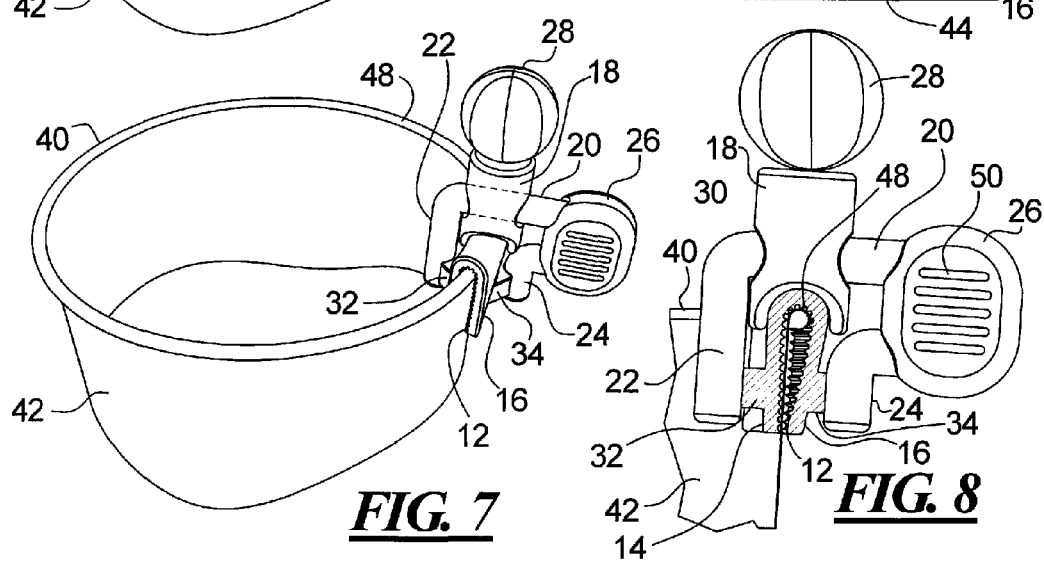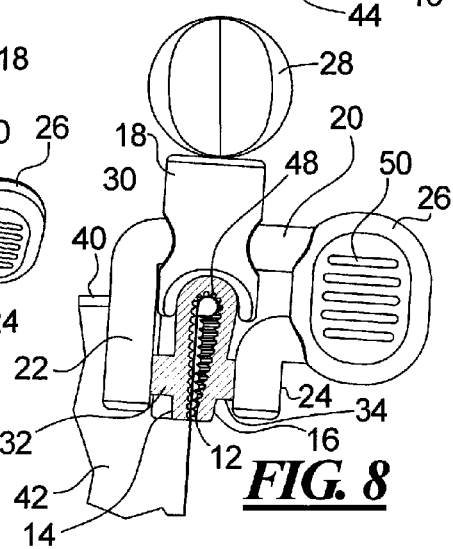

DETACHABLE BEVERAGE CONTAINER HANDLE

CROSS-REFERENCE TO RELATED APPLICATION

This application is a continuation-in-part application of co-pending U.S. patent application Ser. No. 11/454,138, filed Jun. 16, 2006, which is incorporated by reference herein.

BACKGROUND OF THE INVENTION

1. Field of the Invention

This invention is directed in general to a detachable beverage container handle, and more specifically the invention relates to a reusable figurine-shaped handle, which can be mounted and released from a plurality of beverage container diameters.

2. Description of the Related Art

Numerous types of beverages are sold in cans or cups that are similar in shape and design but which vary in other aspects, such as diameter, particularly top rim diameter, among various can manufacturers.

Throughout their history, the beverage industry, in cooperation with the can manufacturers, have experimented with various can sizes for packaging soft drinks, beer, and the like. The cans have varied in such ways as volume (12 ounces and 16 ounces, e.g.), as well as height, body and top circumference, etc. Although various can sizes have been tried throughout the years, presently the beverage industry has three primary can sizes, most commonly referred to, and differentiated by, the can top diameter. The can top diameters most commonly utilized today are the 202, which has a can top diameter (the outside diameter of the rim at the top of the can) of approximately 2⅛ inches; the 204, which has a can top diameter of approximately 2¼ inches; and the 206, which has a can top diameter of approximately 2⅜ inches. These cans are typically constructed of aluminum, are most often sealed by an upstanding rim at the top end of the can, with the rim forming a seam along the outer circumference of the top, and provide means disposed upon the can top to manually open the can in order for the contents to be consumed directly out of the beverage can. Unless the drinker takes the intermediate step of transferring the liquid into another drinking container, the liquid contents within the container cannot be consumed without the drinker coming into direct oral contact with the can.

Similarly, conventional single-serve beverages are available at quick serve restaurants or concession stands in various event venues in cups small enough to be held with one hand. As the popularity of multi-serve food packages increases, however, the demand for multi-serve beverages also increases. The cups which hold large quantities of fluid, e.g. 64 oz., are difficult for most individuals to grasp with one hand.

To date, single application attachments of fixed configuration were made to apply to a plurality of beverage container diameters only through the manufacturing of multiple embodiments of detachable drinking attachments, each having a different diameter and/or span. This approach to the problem adds to the cost of manufacturing in the form of producing and inventorying a variety of attachment sizes, as well as for the end user in the form of multiple purchases if he or she wanted to have a detachable drinking attachment regardless of the beverage top diameter. Even if these obstacles were not an issue with the manufacturer or end user there would still remain the disadvantage of having to store and/or transport a variety of attachments.

In addition, due to condensation accumulation on the outer walls of the beverage container resulting from cold beverages, or the heat of hot beverage containers; other consumers of beverages such as children, the elderly, and the disabled, may have difficulty grasping a can or many of the beverage containers because their grips may be too weak or their grip is too small relative to the circumference of each beverage container.

Fans of sports personalities or sports teams, or fans of other public persons, are often looking for ways to show their support for their favorite team, both while at a sporting event and otherwise.

Holders for cups and beverage containers should be securely affixed to the cup or container to prevent inadvertent release from the cup or container, thereby reducing the chance of spilling the beverage.

SUMMARY OF THE INVENTION

In one embodiment, the invention provides a detachable handle for a beverage container having a base and a side wall connected to the base wherein the wall has a rim, the detachable handle comprising a first coupling means for detachably connecting to the base; a second coupling disposed from the first coupling means for detachably connecting to the wall; and a figurine disposed therebetween.

In another embodiment, the invention provides a detachable handle for a container having a base and a wall connected to the base wherein the wall has a rim comprising a first coupling means for detachably connecting to the base; a second coupling disposed from the first coupling means for detachably connecting to the wall; and a figurine disposed therebetween, adapted to be coupled, at different times, with the tops of a first and second container to direct liquid from each of the beverage containers to a drinker's mouth, the top of the first container having a first annular rim defining a first diameter, the top of the second beverage container having a second annular rim defining a second diameter, wherein the first annular rim of the first beverage container is different in diameter from the second annular rim of the second beverage container.

In one embodiment, the invention provides a detachable handle for a container having a base and a wall connected to the base wherein the wall has a rim comprising a first coupling means for detachably connecting to the wall; a second coupling disposed from the first coupling means for detachably connecting to the base; and a figurine disposed therebetween.

In a further embodiment of the invention, the detachable handle has a clamp that is fastenable to engage the rim of a cup or other beverage container. The clamp is operable to fasten the handle to a rim of a cup or other beverage container and is operable to disengage the handle from the beverage container. The clamp has a latch for pressing the clamp to the engaging position when in the latched position and for the releasing the clamp from the beverage container when in the unlatched position.

BRIEF DESCRIPTION OF THE DRAWINGS

FIG. 3 is perspective view of a second embodiment of a rim clamp according to the principles of the present invention;

FIG. 4 is an end view of the rim clamp of FIG. 3;

FIG. 5 is a perspective view, generally from above, of the rim clamp mounted on the rim of a cup and in an unlocked position;

FIG. 6 is a side elevational view of rim clamp of FIG. 5 showing the rim clamp in the unlocked position and including an arrow indicating operation to a locked position;

FIG. 7 is a perspective view, generally from above, of the rim clamp mounted on the rim of the cup and shown in the locked position;

FIG. 8 is an end elevational view, partially in cross section, of the rim clamp in the locked position on the rim of the cup.

DETAILED DESCRIPTION OF THE PREFERRED EMBODIMENTS

Figure 1:
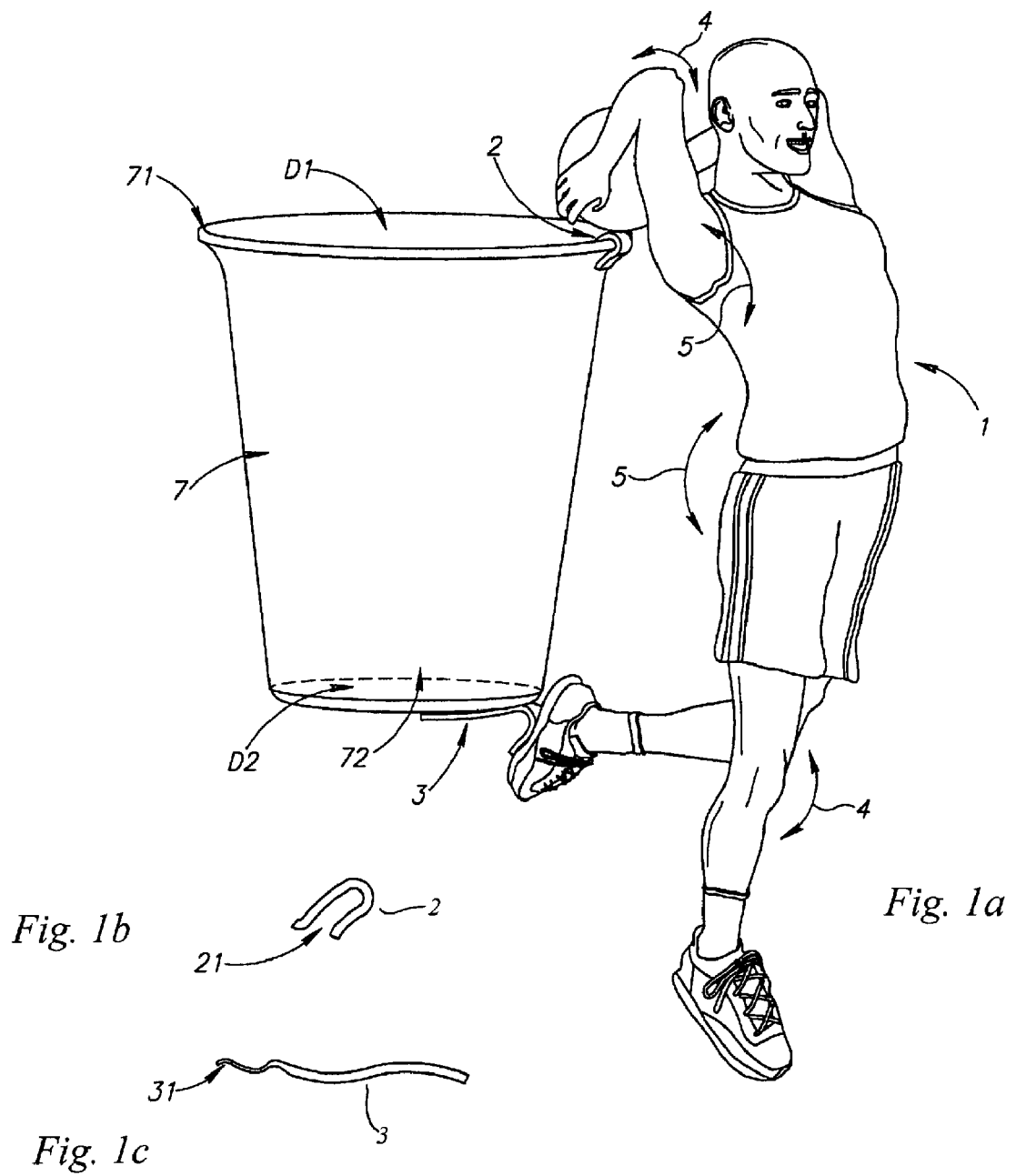
FIG. 1a is a front perspective view of a humaniform-shaped handle attached to a beverage container by coupling means on the extremities of the human-shaped figurine.
FIG. 1b is a side view of the rim coupling means of the human-shaped figurine of FIG. 1.
FIG. 1c is a side view of the bottom coupling means of the human-shaped figurine of FIG. 1.

This invention relates in one embodiment to a detachable and reusable handle for a container, such as a beverage container in certain embodiments. In FIG. 1a is shown an embodiment of a human-shaped or humaniform handle 1 disposed between a first coupling element 2 and a second coupling element 3. The coupling elements 2 and 3 are attached to extremities of a human-shaped portion 4 of the handle, wherein the body and extremities of the human-shaped portion 4 are capable of being restrictively adjusted by hinges 5. The coupling element 2 is attached to a top rim 71 of a wall 7 of a beverage container having a first diameter D1 and the coupling element 3 is attached to a bottom base 72 of the beverage container having a second diameter D2.

In one embodiment, the invention provides a detachable handle for a container having a base and a wall connected to the base wherein the wall has a rim, the handle comprising a first coupling for detachably connecting to the base; a second coupling disposed spaced from the first coupling means for detachably connecting to the wall; and a figurine disposed therebetween.

In another embodiment, the invention provides a container comprising a detachable handle on a container wherein the container has a base and a wall connected to the base and the wall has a rim, the handle including a first coupling for detachably connecting to the base; a second coupling disposed spaced from the first coupling for detachably connecting to the wall; and a figurine disposed therebetween. In a further embodiment, a detachable handle for a container, wherein the container has a base and a wall connected to the base and the wall has a rim, the handle comprising: a first coupling for detachably connecting to the wall; a second coupling disposed spaced from the first coupling for detachably connecting to the base; and a figurine disposed therebetween.

With reference to FIG. 1a, an embodiment of the invention provides a detachable handle for a container having a base 72 and a wall 7 connected to the base 72 wherein the wall 7 has a rim 71, the handle comprising: a first coupling 2 for detachably connecting to the wall 7; a second coupling 3 disposed spaced from the first coupling 2 for detachably connecting to the base 72; and a human-shaped figurine 1 disposed therebetween. The container to which the detachable handle is coupled is may be a beverage container or other container.

Conventional single-serve beverages are available at quick serve restaurants, as well as at public events, in cups small enough to be held with one hand. As the popularity of multi-serve food packages increases, however, the demand for multi-serve beverages also increases. Beverage cups which hold larger quantities of liquid are becoming available. These larger cups, which hold for example as much as 64 oz. or more, are difficult for most individuals to grasp with one hand. In one embodiment, the detachable container handle described herein is adjustable to accommodate these large cups to facilitate holding and carrying the cups.

In another embodiment, the handle 1 described herein is detachably attached to a rim 71 of the cup. The first coupling element 2 of the detachable handle 1 is capable of detachably attaching to the top rim 71 of the wall 7 of the beverage container. The beverage container may be a cup or a can having a rim 71 of a first diameter D1 and a base of the same diameter or a different diameter D2.

In an embodiment, the invention provides a detachable handle 1, having first coupling element 2 that is formed or molded of resilient material. The coupling element 2 is shown in FIG. 1b including a C-clamp 21, wherein the C-clamp 21 defines an opening capable of securely engaging the top rim 71 of the beverage container. The first coupling element 2 and the second coupling element 3 may be formed of plastic or resilient metal. The first detachable coupling element 2 is preferably made such that when it is attached to the container, axial movement of the container is substantially prevented.

In one embodiment, the second coupling element 3, used in the detachable handle 1 is described herein, is made of a resilient material. In an embodiment shown in FIG. 1c, the second coupling element comprises a substantially flat member 31, wherein the member 31 is curved toward the base of the container, in a way that through tension created by attaching the second coupling element 3 to the base 72 of the container 7, the container 7 is stabilized against the first coupling element 2.

A person skilled in the art would recognize that through the use of hinges 5 disposed in the body and at the joints of the figurine's 1 extremities 4, the user could adjust the span defined between the first and second coupling elements 2 and 3, thereby accommodating a larger or smaller container.

Figure 2:
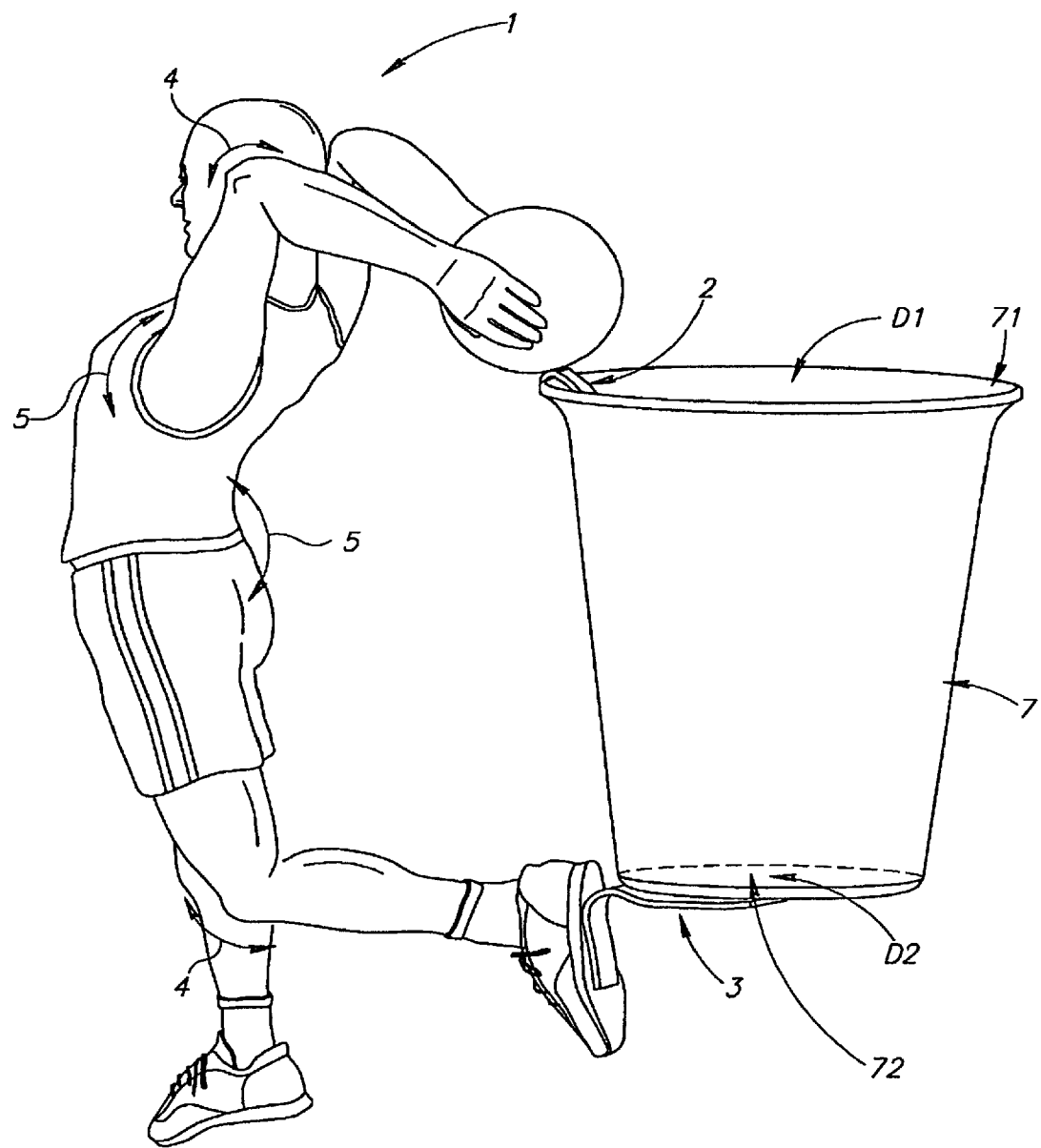
FIG. 2 is a rear perspective view of the humaniform-shaped handle of FIG. 1 attached to the beverage container.

Referring now to FIGS. 1a and 2 of the drawings, the human-shaped figurine 1 is a sports personality, in this embodiment a basketball player, having a torso and limbs or extremities. The figurine is formed of molded plastic or other material and may be painted or printed to provide a realistic representation of a sports personality on which the figurine is modeled. The illustrated figurine is a basketball player holding a basketball that is posed to appear as though the player is scoring by placing the basketball into the beverage container or cup. Other sports personalities, including those who play football, soccer, baseball, hockey, do auto racing, wrestling and the like may be represented by the figurine. The sports personality may be represented with an article used in the sport, such as a ball, glove, bat, puck, steering wheel or other sports article or equipment that characterize the sport, or the sports figurine may be represented without the sports article or equipment. The figurine may represent persons from other walks of life, from history, characters from movies or television shows or the like and may be shown with articles that relate to the personality, such as a book, skull, tool or the like. The figurine may instead represent animals, such as mammals, plants such as trees or other items, articles or things.

One or more hinges may be provided on the figurine. The illustrated figurine 1 includes an adjustable hinge assembly 5 connecting an upper arm element to the torso of the figurine. A further hinge 4 may be provided connecting the upper arm element to a lower arm element. The upper arm element may be adjustably secured within a recess of the torso and may be attached to the lower arm segment by an engagement plate by one or more fasteners. A hinge 4 may be provided at the knee joint of the figurine's leg so that the second coupling element 3 may be moved into contact with the base of the beverage container. In another embodiment, an adjustable hinge assembly 5 is connected between the second coupling element 3 and the figurine 1 for permitting the second coupling element to be pivoted as a unit between a closed position in relation to the figurine, as illustrated in FIG. 1, and an open position. Instead of or in addition to one or more other hinges, a hinge 5 may be provided at the waist of the figurine 1. The hinge, or in embodiments having multiple hinges, the hinges allow the same figurine to be used for a plurality of container dimensions.

In one embodiment, the adjustable hinge 5 comprises a thumb screw that is capable of locking the hinge at the desired position. The thumb screw is molded of the same material that the figurine 1 is made of, or may be formed of another material. Other hinge structures may be provided as well, including locking hinges and detent enabled hinges.

FIG. 2 shows an embodiment in a side view of the figurine shaped handle, where the hinges 5 are adjustable to accommodate a smaller sized beverage container 7 than the container of FIG. 1. The container has a rim diameter D1 and a base diameter D2, which differ from the corresponding diameters of other containers to which the handle may be affixed. The figurine is attached thereto with the first coupling element 2 having a C-shape configuration 21 defining an opening capable of engaging the rim 71 and the second coupling element 3 having a configuration 31 capable of attaching to the base of container 7.

FIG. 3 shows alternate embodiment of the coupling element for attaching the detachable handle to the beverage container. Here, the coupling element is a clamp 10 that is operable to securely engage a rim of a cup or other beverage container and that is operable to release the rim of the container. The clamp 10 includes a pair of opposed gripping surfaces 12 on inner and outer flaps 14 and 16. A latch support 18 extends from the flaps 14 and 16 and holds a latch pivot 20. The latch pivot 20 is connected to inner and outer latch arms 22 and 24. A grip 26 is provided attached to the outer latch arm 24. The latch support 18 is attached to a sports article 28, here shown as a representation of a basketball. A human-shaped figurine 1 representing a basketball player is attached to the basketball 28, although the figurine is not shown here for the sake of simplicity.

With reference to FIG. 4, the clamp 10 is adapted for mounting on the curved rim of a cup, drinking glass, beverage can, or even a bottle or other beverage container. As such, the inner and outer flaps 14 and 16 are curved to accommodate the curve of the container rim. Since cups and cans come in a variety of sizes, the curvature of the flaps 14 and 16 is at an intermediate value. In one example, the radius of curvature of the flaps 14 and 16 is between 1⅝ inch and 2⅝ inch, although other radii are of course possible.

The flaps 14 and 16 are connected to one another by a U-shaped flap connector portion 30 that is curved like the flaps. The flap connector portion 30 is flexible to permit the flaps 14 and 16 to be moved to a gripping or latched position and to flex to a release or unlatched position. The flaps and connector 14, 16 and 30 may be molded in one piece of plastic. The gripping surfaces 12 of the flaps 14 and 16 are ribbed, nubbed or otherwise textured to provide secure engagement with the rim of a cup or can or may be smooth. The textured gripping surfaces 12 may line the entire inner surface of the flaps 14 and 16 as shown or may be provided only along the lower portions of the flaps. Other configurations are also possible. The gripping surfaces 12 may be formed of the same material as the flaps 14 and 16 or may be formed of a soft gripping material such as rubber.

The outer surfaces of the inner and outer flap 14 and 16 include notched ramps 32 and 34. The notched ramps 32 and 34 are positioned on the flaps 14 and 16 spaced from the connector portion 30 so that pressure on the ramps causes the flaps 14 and 16 to flex toward one another. The notched ramps 32 and 34 include angled ramp portions extending in opposite directions with a notch between the angled ramp portions. The ramps and notch are configured to permit the latch arms 22 and 24 to move on the ramp and rest in the notch.

The latch support 18 of the illustrated embodiment is a post connected to the flaps 14 and 16. Other configurations of the latch support are also possible. The latch support 18 has a bore or passage 36 through which extends the latch pivot 20. The latch pivot 20 is rotatable in the bore 26 so that rotation of the grip 26 results in rotation of the latch arm 22.

The basketball replica 28 is mounted on the latch support 18 by a mounting spike 38 in one embodiment. The spike 38, shown in phantom in FIG. 4, extends from the support 18 a sufficient distance to connect the article 38 and the figurine handle to the clamp 10. Other means of mounting a sports article, a figurine or other item to the clamp 10 are also envisioned and are encompassed within the scope of the present invention.

In FIG. 5, the clamp 10 is positioned on a rim 40 of a cup 42. The latch arms are in the unlocked position, as shown in FIGS. 3 and 4, so that the flaps 14 and 16 readily slip onto the rim 40. The upper edge of the rim 40 rests against the connector portion 30 in the illustration, although the clamp 10 need not be seated all the way onto the rim to provide the secure connection to the beverage container. As noted above, the figurine is not shown in the FIGS. 3-8 for the sake of simplicity of illustration, but would be present in the actual device.

Referring to FIG. 6, the clamp 10 is shown in side view in the unlocked position. An arrow 44 indicates the direction of movement of the latch arm 24 and grip 26 to move the clamp 10 to the locked position. By grasping the grip 26 and twisting, the user is able to pivot the latch arm 24 onto the ramp 34 and into engagement within the notch 46. The ramp 34 includes sloping ramp surfaces so both sides of the notch 46 to permit the user to pivot the grip 26 to and from a latched position from either direction. It is possible that some embodiments may be provided with a single ramp for locking and unlocking movement to only one side of the notch.

FIG. 6 shows that the flaps 14 and 16 have a length in the direction of the cup rim that is greater than the latch support 18. This need not be the case in every instance. Shorter flaps 14 and 16 may be provided or a wider latch support. Other configurations are also possible.

In FIG. 7, the clamp 10 has been operated by the user to secure it, along with the figurine handle (not shown in this view), to the rim 40 of the beverage container 42. The grip 26 has been rotated to move the latch arms 22 and 24 into the notches 46 on the ramps 32 and 34. The latch arms 22 and 24 exert a pressing force on the flaps 14 and 16 to squeeze the gripping surface 12 onto the rim portion 40 of the cup 42. The gripping force exerted by the clamp 10 ensures that the detachable figurine handle remains affixed to the beverage container while the clamp 10 is latched and that the beverage container may be removed when desired.

FIG. 8 shows the latched position of the clamp 10, including the inner latch arm 22 in the notch of the ramp 32 to press the inner flap 14 against the inside wall of the cup 42 and the outer latch arm 24 in the notch 34 to press the outer flap 16 against the outside wall of the cup 42. The grip surface 12 secures the cup 42 and clamp together. If the cup rim 40 has a flange or other enlarged edge, for example at 48, the flange 48 is clamped in the connector portion 30, providing an added measure of security against inadvertent removal of the cup 42 from the clamp 10.

In an alternative embodiment, only one of the latch arms 22 or 24 is provided. The single pivoting latch arm presses the corresponding flap against a stationary opposing flap to engage the rim of the cup.

The grip 26 includes a textured gripping surface 50 to ensure that user may comfortably move the latch between the locked and unlocked positions. The grip 26 may be formed of a soft material, such as rubber, or only the gripping surface 50 may be formed of the soft material, for user comfort.

The clamp 10 may be formed entirely of one material, such as plastic, or may be formed of a combination of materials. For example, the latch arms 22 and 24 may be formed of a metal whereas the grip 26, flaps 14 and 16 and latch support 18 are formed of plastic. Other materials are of course possible.

Thus, there is shown and described a detachable handle for a drink cup or other beverage container. The handle includes a figurine portion that represents a sports personality or other person, character or thing. The handle includes a lower coupling element for engagement with the base of the beverage container and a top coupling element for engaging the top edge of the cup or other beverage container. In one embodiment, the upper coupling element includes a clamp having inner and outer flaps with a layer of rough material on the inside of the flaps to grip the cup. A latch support extends upward from the flaps and has a hole through which extends a latch pivot. The latch has two arms the press against the flaps to lock the flaps onto the rim of the cup. The two arms pivot out of engagement with the flaps so that the flaps can be opened to release the cup. A thumb tab is attached to the pivot and one of the arms so that the user can pivot the arms between the grip position and the release position. A recess is formed on the flaps to lock the arms in the engagement position.

Although other modifications and changes may be suggested by those skilled in the art, it is the intention of the inventors to embody within the patent warranted hereon all changes and modifications as reasonably and properly come within the scope of their contribution to the art.

We claim:

1. A detachable handle for a beverage container having a base and a wall connected to the base, the wall having a rim, comprising:
    a handle in a shape of a figurine;
    a hinge in said figurine for pivoting movement of a first portion of the figurine relative to a second portion of the figurine;
    a first coupling element attached to said figurine and configured for engaging the base of the beverage container;
    a clamp attached to said figurine, said clamp having first and second clamp portions engagable on the rim of the beverage container, said first clamp portion having a grip surface disposed and configured to engage an inside of the rim of the beverage container, said second clamp portion having a grip surface disposed and configured to engage an outside of the rim of the beverage container; and
    a pivoting arm mounted to be movable between a first position and a second position, said first position of said pivoting arm urging said first and second clamp portions toward one another to a position capable of engaging the rim of the beverage container, said second position of said pivoting arm releasing said first and second clamp portions from engagement of the rim of the beverage container, said pivoting arm bearing against an outside of one of said first and second clamp portions in said first position so as to press said first and second clamp portions toward one another.

2. A detachable handle as claimed in claim 1, further comprising:
    a thumb tab on said pivoting arm for grasping by a user to permit the user to pivot said pivoting arm between said first and second positions; and
    a latch pivot to which the thumb tab and the pivoting arm are attached, the latch pivot being rotatable about an axis extending substantially perpendicular to the rim of the beverage container.

3. A detachable handle as claimed in claim 1, wherein said pivoting arm includes first and second pivoting arms mounted for simultaneous pivoting movement between said first and second positions, said first and second pivoting arms bearing on respective outside surfaces of said first and second clamping portions when said first and second pivoting arms are in said first position.

4. A detachable handle as claimed in claim 1, further comprising:
    a latch support extending from said first and second clamp portions; and
    a pivot pin extending through said latch support and rotatable therein, said pivot pin being connected to said pivoting arm.

5. A detachable handle as claimed in claim 4, wherein said latch support is connected to said figurine.

6. A detachable handle as claimed in claim 1, wherein said figurine is of a human form and said hinge moves said figurine at a location and in a direction as movable by a human represented by the figurine.

7. A detachable handle for a beverage container having a base and a wall connected to the base, the wall having a rim, comprising:
    a handle in a shape of a figurine having a human shape;
    a hinge in said figurine for pivoting movement of a first portion of the figurine relative to a second portion of the figurine, said hinge moves said figurine at a location and in a direction as movable by a human represented by the figurine;
    a first coupling element attached to said figurine and configured for engaging the base of the beverage container;
    a clamp attached to said figurine, said clamp having first and second clamp portions engagable on the rim of the beverage container;
    first and second pivoting arms mounted to be movable between a first position and a second position, said first position of said pivoting arms urging said first and second clamp portions toward one another to a position capable of engaging the rim of the beverage container, said second position of said pivoting arms releasing said first and second clamp portions from engagement of the rim of the beverage container, said first and second pivoting arms mounted for simultaneous pivoting movement between said first and second positions, said first and second pivoting arms bearing on respective one of said first and second clamping portions when said first and second pivoting arms are in said first position, said first pivoting arm being disposed within the rim of the beverage container when in the first position and said second pivoting arm being disposed outside the rim of the beverage container when in the first position so as to engage the rim of the beverage container between said first and second pivoting arms;

a latch support extending from said first and second clamp portions;

a pivot pin extending through said latch support and rotatable therein, said pivot pin being connected to said pivoting arm, said pivot pin rotating about a pivot axis extending substantially normal to the wall of the beverage container;

a thumb tab on said pivoting arm for grasping by a user to permit the user to pivot said pivoting arms between said first and second positions.

8. A detachable handle as claimed in claim 7, wherein said figurine is a sports personality in a sport, and further comprising: a representation of an article used in the sport and associated with the figurine.

9. A detachable handle as claimed in claim 8, wherein said sport is a ball sport and said article is the ball used in the sport, wherein the ball is attached to said latch support.

10. An adjustable detachable handle for a container having a base and a wall connected to the base, wherein the wall has a rim, comprising:

a rim coupling element for detachably connecting to the rim of the container; and a figurine mounted to said rim coupling element, wherein the figurine is a humaniform or an animal form and wherein said rim coupling element is operably attached to an integral adjustable extremity of said humaniform or animal form, said adjustable extremity being adjustable by hinged movement at a location on said figurine corresponding to a movable joint on the humaniform or animal form depicted by said figurine to provide natural movement of the figurine during adjustment of the adjustable extremity;

wherein said rim coupling element includes first and second flaps of a rim gripping member, said first and second flaps being compressible toward one another by a latch arm bearing on an outside surface of one of said first and second flaps, and a grip engagable by a user to move said latch arm between a latched position and an unlatched position by rotating the latch arm about an axis substantially normal to the rim of the beverage container being gripped.

11. An adjustable detachable handle as claimed in claim 10, wherein the container is a beverage container.

12. An adjustable detachable handle as claimed in claim 11, wherein said rim coupling element is constructed for detachably attaching to the top rim of the wall of the beverage container.

13. An adjustable detachable handle as claimed in claim 11, wherein said beverage container is a cup or a can.

14. An adjustable detachable handle as claimed in claim 10, wherein said first and second flaps include two opposed gripping surfaces defining an opening capable of receiving a top rim of a beverage container.

15. An adjustable detachable handle as claimed in claim 10, wherein said base coupling element is formed of a resilient material and comprises a substantially flat member, wherein said flat member is curved toward the base of the container.

16. An adjustable detachable handle as claimed in claim 10, wherein the adjustable extremities are capable of being restricted in motion following adjustment by a locking apparatus.

17. An adjustable detachable handle as claimed in claim 10, wherein the humaniform or animal form is an athlete, an actor, a cartoon character, a celebrity, a politician, or if an animal is a mammal.

18. An adjustable detachable handle as claimed in claim 10, wherein said figurine includes an article, said article being a bat, a ball, a racquet, a book, a skull or a tool.

19. An adjustable detachable handle as claimed in claim 10, wherein said handle is adapted to be coupled, at different times, with first and second containers of different sizes, a top of the first container having a rim of a first diameter, a top of the second container having a rim of a second diameter which differs from said first diameter, and wherein an axial distance between the rim of the first container and its base is different from an axial distance between the rim of the second container and its base.

20. An adjustable detachable handle as claimed in claim 10, wherein said rim gripping member is a unitary rim gripping member.

21. A detachable handle as claimed in claim 1, further comprising:

a notched ramp on an outer surface of at least one of said first and second clamp portions into which the pivoting arm engages when in the first position.

22. A detachable handle as claimed in claim 3, further comprising:

first and second notched ramps on outer surfaces of respective ones of said first and second clamp portions into which respective ones of the first and second pivoting arms engage when in the first position.

* * * * *